United States Patent
Ogram

(10) Patent No.: US 7,855,476 B2
(45) Date of Patent: Dec. 21, 2010

(54) ATMOSPHERIC ELECTRICAL GENERATOR

(76) Inventor: Mark Ellery Ogram, 780 S. Freeman Rd., Tucson, AZ (US) 85748

( * ) Notice: Subject to any disclaimer, the term of this patent is extended or adjusted under 35 U.S.C. 154(b) by 254 days.

(21) Appl. No.: 12/218,297

(22) Filed: Jul. 14, 2008

(65) Prior Publication Data

US 2010/0007218 A1    Jan. 14, 2010

(51) Int. Cl.
*H02G 11/00* (2006.01)
(52) U.S. Cl. .................. 307/145; 307/149; 361/218; 361/230
(58) Field of Classification Search ............... 307/149, 307/145; 244/30, 31; 174/2; 361/212, 215–218, 361/230, 231
See application file for complete search history.

(56) References Cited

U.S. PATENT DOCUMENTS

| | | | | |
|---|---|---|---|---|
| 674,427 | A * | 5/1901 | Palencsar | 307/149 |
| 911,260 | A * | 2/1909 | Pennock | 307/149 |
| 1,014,719 | A * | 1/1912 | Pennock | 307/149 |
| 1,540,998 | A * | 6/1925 | Plauson | 310/309 |
| 3,121,196 | A * | 2/1964 | Kasemir | 324/464 |
| 4,234,167 | A * | 11/1980 | Lane | 254/291 |
| 4,486,669 | A * | 12/1984 | Pugh | 290/44 |
| 4,842,219 | A * | 6/1989 | Jakubowski et al. | 244/31 |
| 5,203,542 | A | 4/1993 | Coley et al. | |
| 6,254,034 | B1* | 7/2001 | Carpenter | 244/153 R |
| 6,829,911 | B2 | 12/2004 | Davis et al. | |
| 6,961,662 | B2 | 11/2005 | Murphy | |
| 7,016,785 | B2 | 3/2006 | Makela et al. | |
| 7,200,418 | B2 | 4/2007 | Kaikuranta et al. | |
| 7,330,366 | B2 | 2/2008 | Lee et al. | |
| 7,375,492 | B2 | 5/2008 | Calhoon et al. | |
| 7,378,181 | B2 | 5/2008 | Skinlo | |
| 7,388,350 | B1 | 6/2008 | Wright | |
| 7,394,671 | B2 | 7/2008 | Fukumoto et al. | |
| 7,397,220 | B2 | 7/2008 | Uchida et al. | |

* cited by examiner

*Primary Examiner*—Fritz M Fleming
(74) *Attorney, Agent, or Firm*—Mark Ogram

(57) ABSTRACT

A mechanism to tap an electrical source which uses an aircraft (preferably a lighter than air balloon) tethered by a conductive line. The conductive line is extended/withdrawn by a winch motor to adjust the altitude of the aircraft. The conductive line is isolated from the ground and an electrical conductor is connected to the conductive line and to an electrical load. In this manner, static electricity generated in the atmosphere is gathered for use.

15 Claims, 4 Drawing Sheets

REPLACEMENT

ATMOSPHERIC ELECTRICAL GENERATOR

BACKGROUND OF THE INVENTION

This invention relates to the production of electrical energy and more particularly to the production of electrical energy from the atmosphere.

Everyone is familiar with Benjamin Franklin's kite experiment of 1752. Using a kite whose string had become wet, negative charges from the passing clouds flowed into the string, down to the suspended key, and then into a Leyden jar via a thin metal wire. Franklin was protected by a dry silk string; but, when Franklin's knuckle came too close to the key, he received a strong shock. Fortunately, Benjamin Franklin was not killed, others who tried this same experiment were not so lucky.

Since then, the formation of lightning has remained something of a mystery. Lightning bolts are triggered when a negatively charged cloud base induces a positive charge from the ground, thereby forming a "pathway" for the discharge of the collected electrical energy.

Lightning travels up to 60,000 miles per hour with a flash that is brighter than ten million 100-watt lightbulbs. This wattage is as much power as is produced by all of the electricity plants in the United States and with a voltage of up to 300 million volts.

It is this very fact, the power within lightning is immense, that has prevented any successful collection of the electrical energy from lightning. The electricity in lightning is far too extreme for current technology to harness.

While lightning has attracted a energy starved industrial world, no one has developed any technique to harness this naturally occurring electrical source.

It is clear there is a continuing need for an electrical source other than carbon-based fuels and that the naturally occurring electricity in the atmosphere is being ignored.

SUMMARY OF THE INVENTION

The invention is a mechanism which taps into the naturally occurring static electricity in the atmosphere. Whereas heretofore, the attempt to garner electricity from the atmosphere has focused exclusively on capturing lightning, the present invention syphons off the static electricity which is generated from any agitated air and avoids lightning.

Lightning is only the final discharge of the static electricity, whether that lightning is intra-cloud lightning, cloud-to-ground lightning, or inter-cloud lightning. Other types of final discharges are known as heat lightning, summer lightning, sheet lightning, ribbon lightning, silent lightning, ball lightning, bead lightning, elves, jets, and sprites. Well before these discharges are observed, as the atmosphere becomes agitated by wind or thermal activity, static electricity is being generated.

The present invention recognizes that this static electricity is being formed and creates a mechanism to capture it.

The mechanism of this invention utilizes an aircraft such as a lighter than air balloon. While the preferred embodiment uses a foil balloon, a variety of other aircraft are obvious to those of ordinary skill in the art, including, but not limited to: gliders, rubber balloons (such as weather balloons), biaxially-oriented polyethylene terephthalate polyester film balloons, and latex balloons.

Within this discussion, the balloon is referenced, but, the invention is not intended to be limited solely to balloons.

The balloon is sent aloft and is tethered by a conductive line. In this context, the conductive line may be any obvious to those of ordinary skill in the art. For the preferred embodiment, the conductive line is a generically referred to as a "poly-rope" and is commercially available through a variety of sources. A suitable conductive line is described in U.S. Pat. No. 5,203,542, entitled "Apparatus for Improved Electric Fence Wire Construction for use with Intensive Grazing" issued Apr. 20, 1993, to Coley, et al. and incorporated hereinto by reference.

The conductive line is played out of a winch to control the altitude of the balloon. The motor controlling the winch is able to reverse direction to both extend and withdraw the conductive line which is wrapped around a spool on the winch. The winch/spool combination are part of a base unit.

In some embodiments of the invention, the spool is constructed of rubber so as to insulate the conductive line from the winch assembly. In this embodiment, only the conductive line is charged by the atmospheric static electricity while the winch remains neutral.

In yet another embodiment, the winch/spool are part of a base unit which is itself isolated from the ground by an insulator. In this embodiment, the entire base unit is charged by the atmospheric static electricity.

A conductor, such as an insulated wire, is electrically connected to the conductive line. In one embodiment, where the conductive line is electrically isolated from the spool and winch motor, the conductor is connected to the conductive line. In the embodiment where the conductive line is electrically connected to the base unit, then the conductor is connected anywhere on a metallic base unit.

The other end of the conductor is connected to a load. The load in this case can be any of a variety of electrical loads well known to those of ordinary skill in art, including, but not limited to a motor, a battery system, or the electrical grid for the system.

In the preferred embodiment, a sensor array is used to monitor the activities both at the base unit (such as electrical flow within the conductor) and in the surrounding locale.

A sensor monitoring the electrical flow (i.e. voltage and/or current) within the conductor is used to monitor the electrical activity within the conductor.

In the preferred embodiment, a lightning sensor monitors for lightning activity within the locale. As noted earlier, the electrical characteristic of lightning is so extreme that ideally this discharge is avoided as it might damage the mechanism of this invention.

The sensor array is utilized by a controller, such as microprocessor, programmed to operate the mechanism as outlined herein.

The controller operates the winch motor to extend or withdraw the conductive line and by extension the altitude of the balloon. The controller is programmed to operate the winch by monitoring the electrical characteristics of the conductor and adjusting the balloon's altitude to maintain these characteristics within the conductor within a preset range.

This preset range is established either in the base programming of the controller or is established by an operator of the system.

As example, by controlling the amount of current being withdrawn from the atmosphere, the mechanism operates within a safe range and also provides a relatively stable current flow from which a variety of activities can take place (such as DC-AC conversion).

The controller also utilizes the lightning sensor to protect the mechanism from a lightning strike. Should lightning be detected within a pre-determined range (as established by the software or defined by an operator), then the balloon is pulled down to minimize the risk of damage from a lightning strike.

The invention, together with various embodiments thereof will be more fully explained by the following description of the accompanying drawings.

DRAWINGS IN BRIEF

FIG. 1 diagrams the preferred embodiment of the invention.

Figure 4A:
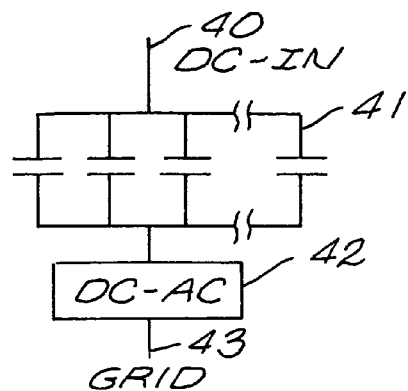
Figure 4B:
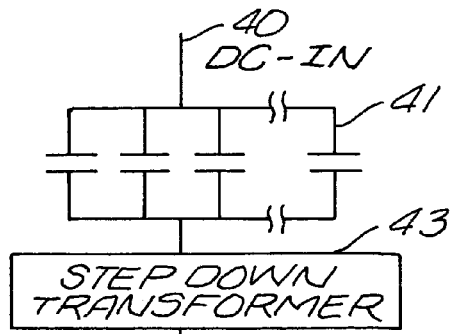
Figure 4C:
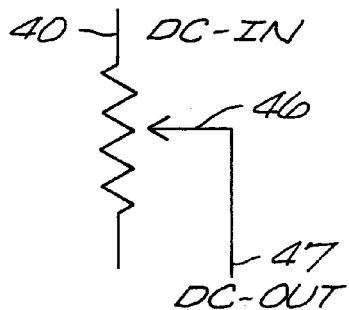

FIGS. 4A, 4B, and 4C are electrical schematics for handling the static charge from the atmosphere.

Figure 5:
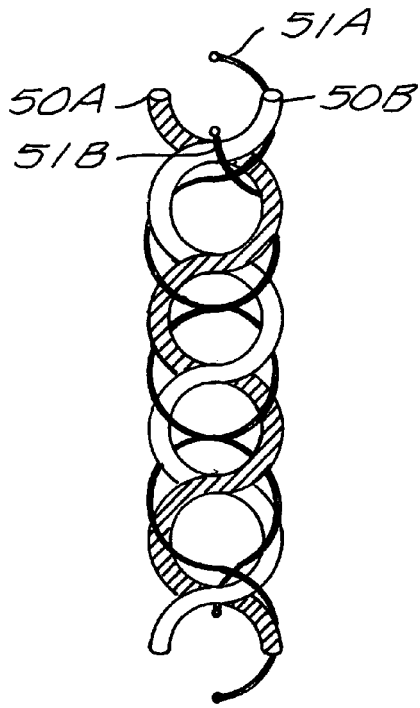

FIG. 5 illustrates a conductive line used in the preferred embodiment of the invention.

Figure 6A:
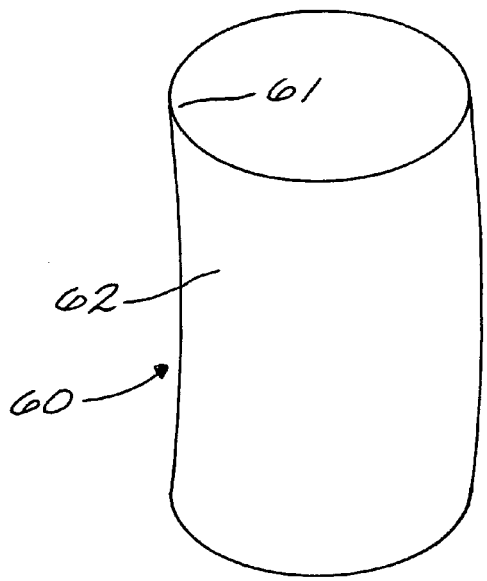
Figure 6B:
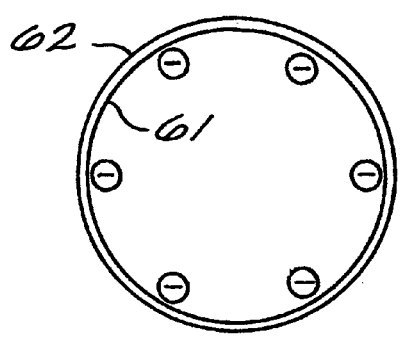

FIGS. 6A and 6B illustrate an alternative conductive line creating an ionized pathway for the flow of the static charges from the atmosphere.

Figure 7:
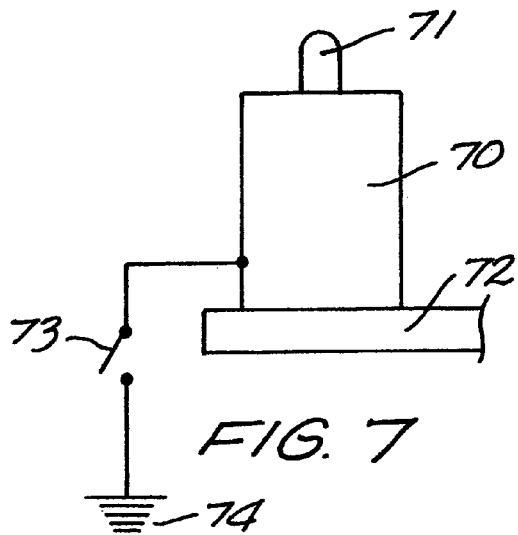

FIG. 7 illustrates the controller of an alternative embodiment and the associated safety devices.

Figure 8A:
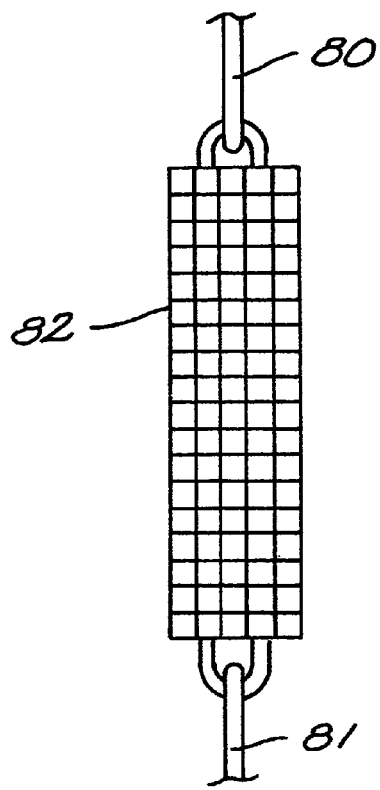
Figure 8B:
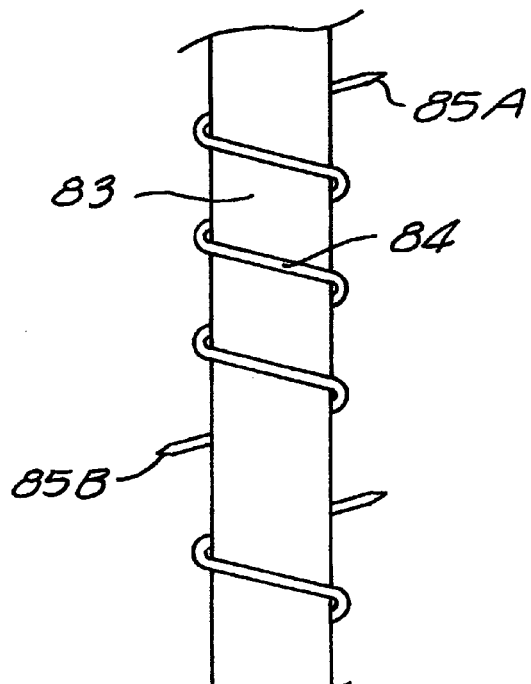

FIGS. 8A and 8B illustrate two embodiments of enhanced electrical collection leads.

DRAWINGS IN DETAIL

Figure 1:
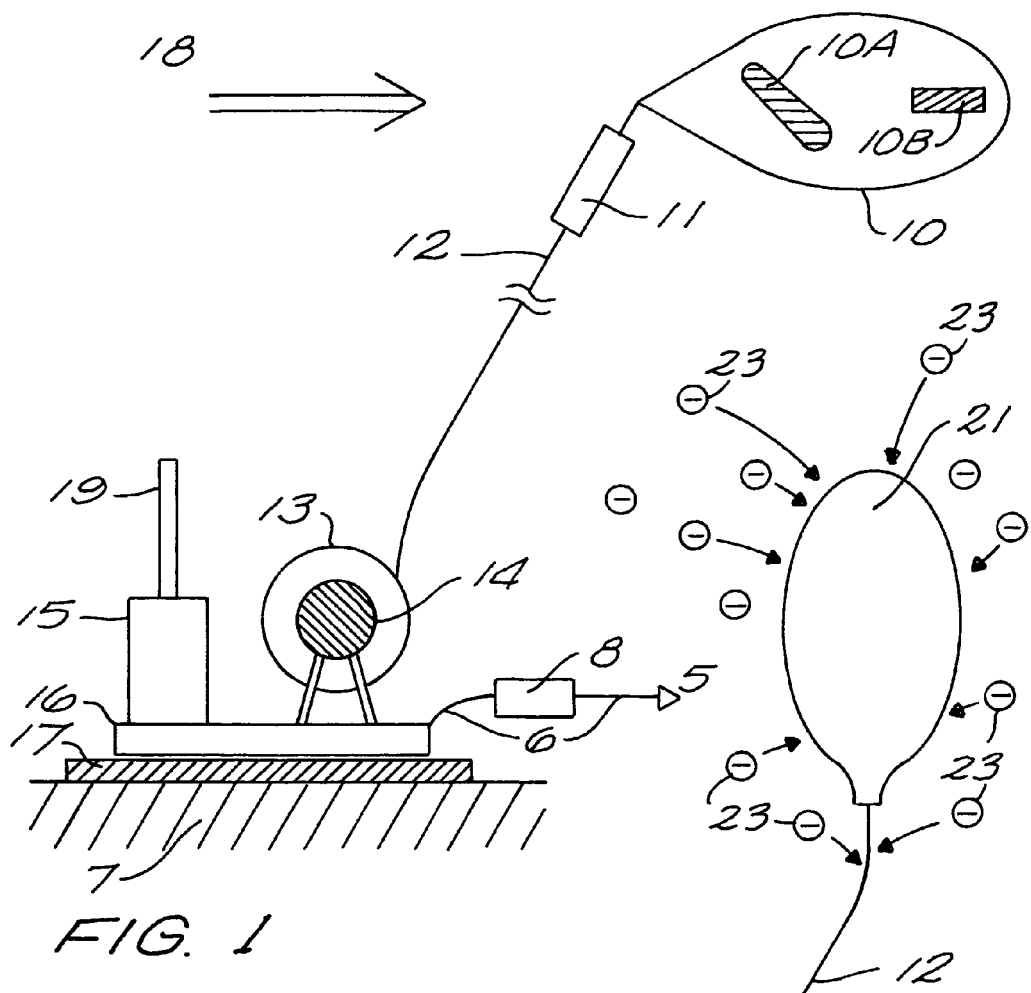

FIG. 1 diagrams the preferred embodiment of the invention.

Balloon 10 is an aircraft which, in this illustration, is a lighter than air balloon. Wings 10A, extending from the body of balloon 10, provide additional lift in air flow 18. Tail 10B helps to stabilize balloon 10.

Balloon 10 is tethered to the ground via conductive line 12. As noted earlier, a variety of configurations and materials are available to serve as conductive line 12. In this illustration, a poly-wire is used Poly-wire is commercially available through a variety of vendors, including, but not limited to: Jeffers Livestock and Zareba Systems, Inc, of Ellendale, Minn.

In this embodiment, located proximate to balloon 10, is an electrical collection enhancement lead 11 which assists in the collection of the static electrical charge in the atmosphere. Electrical collection enhancement lead 11 is configured to attract the static charge and conduct the charge into the conductive line 12.

The electricity flows down the conductive line into spool 13, where the conductive line 12 is collected and either withdrawn or dispensed through operation of winch motor 14.

Winch motor 14 and spool 13 are mounted onto base unit 16 which is electrically isolated from ground 7 using insulator 17. Note, in this embodiment of the invention, when electricity is being collected from the atmosphere, the entire base unit 16 becomes charged. In another embodiment of the invention, spool 13 is constructed of rubber, thereby preventing base unit 16 from becoming charged, thereby restricting the charging from the atmosphere to only conductive line 12.

In this embodiment, conductor 6 is connected to base unit 16 (since the entire base unit 16 is charged and the base unit is metallic) to communicate the electrical current to load 5. Conductor 6 is ideally an insulated wire.

The electrical current through conductor 6 is measured using sensor 8.

In the alternative embodiment discussed above, where only the conductive line 12 is charged, then conductor 6 is connected to conductive line 12.

Controller 15, located in this embodiment on base unit 16, operates winch motor 14 in response to signals from sensor 8 (measuring the current being discharged to load 5) to maintain the current flow within a pre-defined range. As the current flow diminishes, then the conductive line 12 extended from spool 13 to increase the altitude of balloon 10 to that more static charge from the atmosphere is gathered; as the current flow falls exceeds a preset level, conductive line 12 is withdrawn onto spool 13 to decrease the static charge being collected from the atmosphere.

The range of current flow through conductor 6 is ideally set by the program, although some embodiments of the invention permit an operator to establish this range of operation.

In an alternative embodiment, the sensor monitoring conductor 6 monitors the voltage therein.

In the preferred embodiment of the invention, controller 15 is also equipped with a lightning sensor 19. In this embodiment, when lightning is sensed within a preset range, then substantially all of conductive line 12 is wound onto spool 13 to pull balloon 10 near the ground and protect the entire mechanism from being damaged from a lightning discharge.

In the preferred embodiment, the "safe" distance form lightning is set in the programming of controller 15 and is ideally two miles; other embodiments permit the operator to "safe" distance.

There are a variety of lightning sensors well known to those of ordinary skill in the art, including, but not limited to those described in: U.S. Pat. No. 7,016,785, entitled "Lightning Detection" issued to Makela, et al. on Mar. 21, 2006; U.S. Pat. No. 6,829,911, entitled "Lightning Detection and Prediction Alarm Device" issued to Jones, et al. on Dec. 7, 2004; U.S. Pat. No. 7,200,418, entitled "Detection of Lightning" issued to Karikuranta, et al. on Apr. 3, 2007; and U.S. Pat. No. 6,961,662, entitled "Systems and Methods for Spectral Corrected Lightning Detection" issued to Murphy on Nov. 1, 2005; all of which are incorporated hereinto by reference.

In another embodiment of the invention, controller 15 is not located on base unit 16, rather it is remote and communicates its control signals to winch motor 14 using radio waves.

Figure 2:
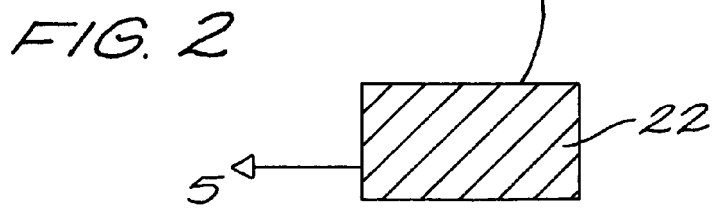
FIG. 2 illustrates the collection of the negative charged particles in the atmosphere.

FIG. 2 illustrates the collection of the negative charged particles in the atmosphere.

Static charges 23 are generated in the atmosphere by agitated air. These static charges are often collected at the bottom of clouds, but exist in other environments as well.

Balloon 21 is extended into this strata of static charges 23 which are then attracted to conductive line 12 to flow to base unit 22 and then onto load 5.

By increasing or decreasing the altitude of balloon 21 (defined by the length of the extended conductive line 12), conductive line 12 is selectively exposed to varying densities and levels of the static charge strata, and by extension, the current flow or voltage is increased or decreased.

Figure 3:
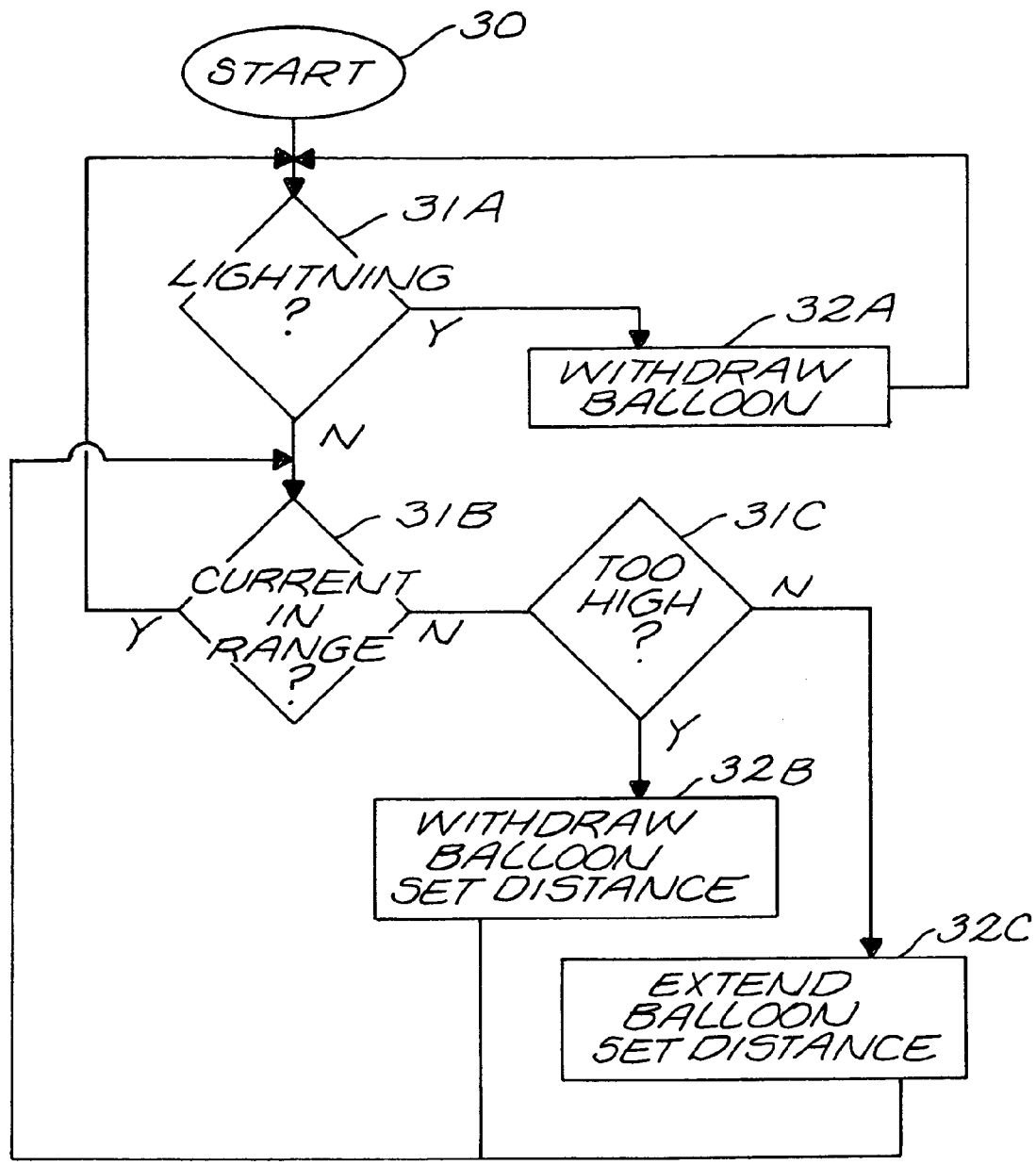
FIG. 3 is a flow-chart of the operation of the controller for the preferred embodiment of the invention.

FIG. 3 is a flow-chart of the operation of the controller for the preferred embodiment of the invention.

Once the program starts 30, the lightning sensor is checked to determine if lightning has occurred within the unsafe range 31A, if it has, then the balloon is lowered 32A, and the program continues monitoring the status of lightning until no lightning is detected.

When the lightning status is acceptable, then the current within the conductor is checked to see if the current is within the prescribed range 31B. If the current is acceptable (within range) the program returns to check the lightning status 31A; otherwise a determination is made to see if the current is above the prescribed range 31C.

If the current is above the prescribed range, then the altitude of the balloon is withdrawn a set amount 32B (ideally twenty-five feet) and the program loops back to see if the current is within range 31B.

If the current is below the prescribed range, then the altitude of the balloon is extended a set amount 32C (ideally twenty-five feet) and the program loops back to see if the current is within range 31B.

In this manner of feed-back and minor adjustments in the altitude of the balloon, the current is maintained within a prescribed range which can be handled by the downstream electrical system.

As noted earlier, some embodiments of the invention monitor the voltage instead of the current.

FIGS. 4A, 4B, and 4C are electrical schematics for handling the static charge from the atmosphere.

By maintaining the voltage being collected in a prescribed range, an electrical conversion system is easily designed. While FIGS. 4A, 4B, and 4C illustrate some electrical configurations, those of ordinary skill in the art readily recognize a variety of other configurations which will serve the same function.

Referencing FIG. 4A, Direct Current In (DC IN) 40 is buffered by a gang of capacitors 41 before being communicated to a DC/AC converter 42. The DC/AC converter converts the direct current into a an alternating current suitable for placement over an existing electrical grid 43 such as normally found from a power-plant.

Those of ordinary skill in the art readily recognize a variety of DC/AC converters, including, but not limited to: U.S. Pat. No. 7,394,671, entitled "Controller IC, DC-AC Conversion Apparatus, and parallel running system of DC-AC Conversion Apparatuses" issued to Fukumoto, et al. on Jul. 1, 2008; and, U.S. Pat. No. 7,330,366, entitled "DC-AC Converter" issued to Lee, et al. on Feb. 12, 2008; all of which are incorporated hereinto by reference.

FIG. 4B illustrates an electrical arrangement suitable for use in charging a battery. DC IN 40 is buffered by capacitor bank 41 before entering into a step down transformer 43. Step down transformer 43 reduces the voltage so that the voltage can safely be introduced into battery 44 which is connected to ground 45 at the battery's other pole.

Those of ordinary skill in the art readily recognize a variety of batteries which will work in this capacity, including, but not limited to those described in: U.S. Pat. No. 7,378,181, entitled "Electric Storage Battery Construction and Manufacture" issued to Skinlo on May 27, 2008; U.S. Pat. No. 7,388,350, entitled "Battery with Electronic Compartment" issued to Wright on Jun. 17, 2008; U.S. Pat. No. 7,397,220, entitled "Connection Member and Battery Pack" issued to Uchida, et al. on Jul. 8, 2008; and, U.S. Pat. No. 7,375,492, entitled "Inductively Charged Battery Pack" issued to Calhoon, et al. on May 20, 2008; all of which are incorporated hereinto by reference.

In FIG. 4C, DC IN 40 is fed into an adjustable rheostat 46 which is controlled by the controller so that the DC OUT 47 falls within a specified range.

FIG. 5 illustrates a conductive line used in the preferred embodiment of the invention.

This type of conductive line is commonly called poly-wire and consists of multiple interwoven strands of plastic 50A and 50B woven into a cord or rope arrangement having intertwined therein exposed metal wires 51A and 51B. While this illustration shows two plastic strands and two metal wires, any number of possible combinations is possible.

The exposed metal wires 51A and 51B attract the atmospheric static charge and transmit the charge down to the base unit (not shown).

FIGS. 6A and 6B illustrate an alternative conductive line creating an ionized pathway for the flow of the static charges from the atmosphere.

This conductive line utilizes a tube 60 having an outer layer 62 of PET Film (Biaxially-oriented polyethylene terephtalate polyester film) which provides exceptionally high tensile strength and is chemically and dimensionally stable. The tube has an ideal diameter of between two and three inches.

An interior metal coating 61 provides an initial conduit for the flow of static charge. The static charge through the metal forces the tube to expand due to the repulsion experienced by like charges. Further, the flow of electricity causes the interior of the tube 60 to become ionized to provide an additional pathway for the atmospheric static charges to the base unit (not shown).

Because outer layer 62 provides a gas barrier, the resulting ionization is not dissipated by air currents, thereby providing a highly stable pathway.

FIG. 7 illustrates the controller of an alternative embodiment and the associated safety devices.

In this embodiment, controller box 70, resting on insulating pad 72, is in communication with the sensors as described above. Using the input from these sensors, when there is flow of electricity through the base unit, warning flashing light 71 is illuminated. To electrically neutralize the mechanism, switch 73 is activated to pass any existing current into the ground 74.

FIGS. 8A and 8B illustrate two embodiments of enhanced electrical collection leads.

Referencing FIG. 8A, enhanced electrical collection lead 82 is a wire mesh which is in electrical communication with conductive line 81 and balloon 80. Because of the significant amount of metal exposed by enhanced electrical collection lead 82, more static electricity from the atmosphere is drawn to the collection lead 82, and then down conductive line 81 to the base unit (not shown).

Conductive lead 82 is positioned proximate to balloon 80.

In FIG. 8B, poly-wire 83 has enhanced electrical collection leads 84 wrapped therearound. Collection leads 84 have pointed ends 85A and 85B which have a propensity to attract more electricity than rounded ends do.

It is clear from the foregoing that the present invention captures an entirely new source of electrical energy.

What is claimed is:

1. A mechanism to tap an electrical source comprising:
   a) a lighter than air balloon suspended in the atmosphere;
   b) a base unit having a spool of conductive line on a winch motor, one end of said conductive line secured to said lighter than air balloon, a portion of said conductive line collecting electricity in the atmosphere, said winch motor capable of selectively extending or withdrawing said conductive line from said spool;
   c) an insulator electrically isolating said conductive line from ground;
   d) a conductor having a first end electrically connected to said conductive line and a second end electrically connected to a load being powered by collected electricity from said conductive line;
   e) an electrical flow sensor monitoring electrical flow through said conductor and generating an electrical flow indicia indicative of said electrical flow in said conductor; and, f) a controller receiving said electrical flow indicia and selectively operating said winch motor such that said electrical flow indicia remains within a selected operating range.

2. The mechanism to tap an electrical source according to claim 1, wherein said selected operating range is established by an operator.

3. The mechanism to tap an electrical source according to claim 2, further including a warning light activated when said electrical flow indicia is non-zero.

4. The mechanism to tap an electrical source according to claim 1,
   a) further including a lightning sensor generating a lightning presence indicia indicative of lightning within a prescribed range, said presence indicia being communicated to said controller; and,
   b) wherein said control mechanism, in response to said lightning presence indicia, operates said winch motor to withdraw substantially all of said conductive line onto said spool.

5. The mechanism to tap an electrical source according to claim 4, wherein said prescribed range is established by an operator.

6. The mechanism to tap an electrical source according to claim 1, further including an electrical collection enhancement lead in electrical contact with a first end of said conductive material, said electrical collection enhancement lead configured to attract static electricity.

7. The mechanism to tap an electrical source according to claim 6, wherein said electrical collection enhancement lead is positioned proximate to said lighter than air balloon.

8. The mechanism to tap an electrical source according to claim 7, wherein said electrical collection enhancement lead includes at least two pointed electrical conductors.

9. The mechanism to tap an electrical source according to claim 1, wherein said insulator electrically isolates said conductive line from said winch motor.

10. The mechanism to tap an electrical source according to claim 1, wherein said insulator electrically isolates said base unit from ground.

11. A mechanism comprising:
    a) an airborne aircraft having a conductive line secured to a winch capable of extending or withdrawing said conductive line from a spool, when said airborne aircraft is aloft, said conductive line collecting electricity from the atmosphere;
    b) a conductor having a first end electrically connected to said conductive line and a second end electrically connected to a load such that collected electricity from said conductive line powers said load;
    c) an electrical flow sensor monitoring electrical flow through said conductor and generating an electrical flow indicia indicative of said electrical flow in said conductor; and,
    d) a controller receiving said electrical flow indicia adjusting an altitude of said airborne aircraft via said winch such that said electrical flow indicia remains within a selected operating range.

12. The mechanism to tap an electrical source according to claim 11,
    a) further including a lightning sensor communicating with said controller; and,
    b) wherein said controller, in response to selected signals from said lightning sensor withdraws substantially all of said conductive line.

13. A mechanism to tap an electrical source comprising:
    a) a lighter than air balloon suspended in the atmosphere;
    b) a base unit having a spool of conductive line on a winch motor, one end of said conductive line suspended by said balloon, a portion of said conductive line collecting electricity from the atmosphere, said winch motor capable of adjusting an altitude of said lighter than air balloon by selectively extending or withdrawing said conductive line from said spool;
    c) a conductor having a first end electrically connected to said conductive line and a second end electrically connected to a load being powered by said collected electricity from said conductive line;
    d) a sensor array having,
       1) an electrical flow sensor monitoring electrical flow through said conductor and generating an electrical flow indicia indicative of said electrical flow in said conductor, and,
       2) a lightning sensor monitoring existence of proximate lightning; and,
    e) a controller responsive to said electrical flow indicia from said sensor array to selectively operate said winch motor.

14. The mechanism to tap an electrical source according to claim 13,
    a) further including a warning light; and,
    b) wherein said controller activates said warning light when said electrical flow in said conductor is non-zero.

15. The mechanism to tap an electrical source according to claim 14, further including an electrical collection enhancement lead in electrical contact with said conductive material, said electrical collection enhancement lead configured to attract static electricity and positioned proximate to said lighter than air balloon.

* * * * *